US011435987B2

(12) United States Patent
Gopalasubramanian et al.

(10) Patent No.: US 11,435,987 B2
(45) Date of Patent: Sep. 6, 2022

(54) OPTIMIZING RUNTIME ALIAS CHECKS

(71) Applicant: ADVANCED MICRO DEVICES, INC., Santa Clara, CA (US)

(72) Inventors: Ganesh Gopalasubramanian, Bangalore (IN); Ashutosh Nema, Bangalore (IN); Venugopal Raghavan, Bangalore (IN)

(73) Assignee: ADVANCED MICRO DEVICES, INC, Santa Clara, CA (US)

( * ) Notice: Subject to any disclaimer, the term of this patent is extended or adjusted under 35 U.S.C. 154(b) by 0 days.

(21) Appl. No.: 16/774,756

(22) Filed: Jan. 28, 2020

(65) Prior Publication Data

US 2021/0191700 A1  Jun. 24, 2021

(30) Foreign Application Priority Data

Dec. 24, 2019 (IN) .......................... IN201911053702

(51) Int. Cl.
 *G06F 8/41* (2018.01)
(52) U.S. Cl.
 CPC .............. *G06F 8/434* (2013.01); *G06F 8/443* (2013.01); *G06F 8/4434* (2013.01); *G06F 8/436* (2013.01); *G06F 8/452* (2013.01)
(58) Field of Classification Search
 CPC ............ G06F 11/3466; G06F 11/3636; G06F 11/3644; G06F 11/3612; G06F 8/40–49
 USPC ........................................ 717/130, 136–161
 See application file for complete search history.

(56) References Cited

U.S. PATENT DOCUMENTS

| 6,173,444 | B1 | 1/2001 | Archambault | |
|---|---|---|---|---|
| 8,285,670 | B2 | 10/2012 | Chen et al. | |
| 2003/0074655 | A1* | 4/2003 | Robison | G06F 8/434 717/162 |
| 2004/0015897 | A1* | 1/2004 | Thompson | G06F 9/44589 717/140 |
| 2009/0037690 | A1* | 2/2009 | Busck | G06F 8/434 711/221 |
| 2013/0283014 | A1* | 10/2013 | Wang | G06F 9/30098 712/217 |
| 2015/0039861 | A1* | 2/2015 | Rong | G06F 9/3834 712/216 |

FOREIGN PATENT DOCUMENTS

WO   2009019213 A2   2/2009

OTHER PUBLICATIONS

Davidson, J. W., et al., Improving Instruction-level Parallelism by Loop Unrolling and Dynamic Memory Disambiguation, Proceedings of the 28th Annual International Symposium on Microarchitecture, Nov. 29-Dec. 1, 1995, pp. 125-132, [retrieved on Feb. 22, 2021], Retrieved from the Internet: <URL:http://ieeexplore.ieee.org/>.*

(Continued)

*Primary Examiner* — Geoffrey R St Leger

(57) ABSTRACT

Optimizing runtime alias checks includes identifying, by a compiler, a base pointer and a plurality of different memory accesses based on the base pointer in a code loop; generating, by the compiler, a first portion of runtime code to determine a minimum access and a maximum access of the plurality of different memory accesses; and generating, by the compiler, a second portion of runtime code including one or more runtime alias checks for the minimum access and one or more runtime alias checks for the maximum access.

20 Claims, 6 Drawing Sheets

(56) References Cited

OTHER PUBLICATIONS

Horizonte, Belo, Enabling Code Optimizations Through Hybrid Analysis Of Memory Access Ranges, Dissertation, Dec. 2016, 98 pages, [retrieved on Apr. 21, 2022], Retrieved from the Internet: <URL:https://repositorio.ufmg.br/bitstream/1843/ESBF-AL6K36/1/periclesrafaeloliveiraalves.pdf>.*

Nema, "Loop Versioning For LICM", 2015 LIVM Developers' Meeting, <<https://llvm.org/devmtg/2015-10/slides/Nema-LoopVersioningLICM.pdf>>, dated Oct. 29-30, 2015, 23 pages.

Wikipedia, "Alias analysis", <<https://en.wikipedia.org/wiki/Alias_analysis>>, printed Oct. 10, 2019, 3 pages.

Wikipedia, "Automatic vectorization", <<https://en.wikipedia.org/wiki/Automatic_vectorization>>, printed Oct. 10, 2019, 9 pages.

Wikipedia, "Loop-invariant code motion", <<https://wikipedia.org/wiki/Loop-invariant_code_motion>>, printed Oct. 10, 2019, 2 pages.

Alves et al., Runtime Pointer Disambiguation, OOPSLA 2015: Proceedings of the 2015 ACM SIGPLAN International Conference on Object-Oriented Programming, Systems, Languages, and Applications, URL: https://doi.org/10.1145/2814270.2814285, Dated Oct. 2015, 18 pages.

International Search Report and Written Opinion, PCT/US2020/066548, dated Apr. 16, 2021, 13 pages.

* cited by examiner

OPTIMIZING RUNTIME ALIAS CHECKS

BACKGROUND

Aliasing refers to the case where the data location in memory can be accessed through different symbolic names in the program. Thus, modifying the data through one name implicitly modifies the values associated with all aliased names. As a result, aliasing has various effects on performance of the compiler and correctness of the code generated by the compiler. Where a value for an alias of a pointer is not known at compile time, runtime alias checks are inserted into the compiled code.

DETAILED DESCRIPTION

Figure 1:
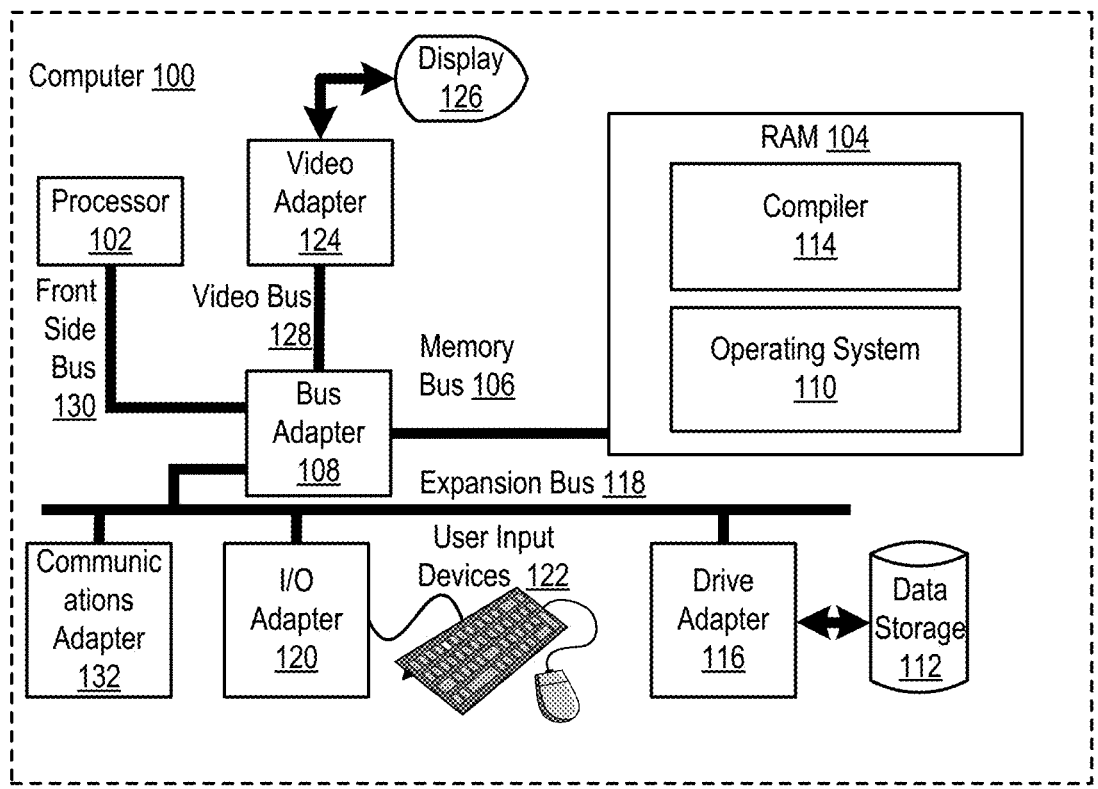
FIG. 1 is a block diagram of an example computing device for optimizing runtime alias checks according to some embodiments.

In some embodiments, a method of optimizing runtime alias checks includes identifying, by a compiler, a base pointer and a plurality of different memory accesses based on the base pointer in a code loop; generating, by the compiler, a first portion of runtime code to determine a minimum access and a maximum access of the plurality of different memory accesses; and generating, by the compiler, a second portion of runtime code including one or more runtime alias checks for the minimum access and one or more runtime alias checks for the maximum access.

In some embodiments, the one or more runtime alias checks are based on one or more other base pointers in the code loop. In some embodiments, the method includes identifying, by the compiler, in the code loop, a first memory access group based on the base pointer and a second memory access group based on another base pointer, wherein the first memory access group and the second memory access group share a common memory access pattern; wherein generating the first portion of runtime code to determine the minimum access and the maximum access of the plurality of different memory addresses includes generating, by the compiler, the first portion of runtime code to determine the minimum access and the maximum access based on the common memory access pattern. In some embodiments, generating the first portion of runtime code to determine the minimum access and the maximum access of the plurality of different memory addresses includes generating, by the compiler, the first portion of runtime code to determine another minimum access for the other base pointer and another maximum access for the other base pointer based on the common memory access pattern; and generating the second portion of runtime code includes generating, by the compiler, the second portion of runtime code including one or more runtime alias checks for the other minimum access and one or more runtime alias checks for the other maximum access.

In some embodiments, the method includes identifying, by the compiler, in the code loop, a first memory access group based on the base pointer and a second memory access group based on another base pointer, wherein the first memory access group and the second memory access group share a common memory access pattern; generating, by the compiler, a third portion of runtime code to determine another minimum access based on the minimum access and determine another maximum access based on the maximum access; wherein generating the second portion of runtime code includes generating, by the compiler, the second portion of runtime code including one or more runtime alias checks for the other minimum access and one or more runtime alias checks for the other maximum access. In some embodiments, the method includes determining, by the compiler, an estimated cost of the one or more runtime checks; and determining, by the compiler, that the estimated cost falls below a threshold; wherein generating the first portion of runtime code and generating the second portion of runtime code are performed in response to the estimated cost falling below the threshold. In some embodiments, the method includes applying, by the compiler, one or more loop optimizations to the code loop.

In some embodiments, an apparatus for optimizing runtime alias checks performs steps including: identifying, by a compiler, a base pointer and a plurality of different memory accesses based on the base pointer in a code loop; generating, by the compiler, a first portion of runtime code to determine a minimum access and a maximum access of the plurality of different memory accesses; and generating, by the compiler, a second portion of runtime code including one or more runtime alias checks for the minimum access and one or more runtime alias checks for the maximum access.

In some embodiments, the one or more runtime alias checks are based on one or more other base pointers in the code loop. In some embodiments, the steps include identifying, by the compiler, in the code loop, a first memory access group based on the base pointer and a second memory access group based on another base pointer, wherein the first memory access group and the second memory access group share a common memory access pattern; wherein generating the first portion of runtime code to determine the minimum access and the maximum access of the plurality of different memory addresses includes generating, by the compiler, the first portion of runtime code to determine the minimum access and the maximum access based on the common memory access pattern. In some embodiments, generating the first portion of runtime code to determine the minimum access and the maximum access of the plurality of different memory addresses includes generating, by the compiler, the first portion of runtime code to determine another minimum access for the other base pointer and another maximum access for the other base pointer based on the common memory access pattern; and generating the second portion of runtime code includes generating, by the compiler, the second portion of runtime code including one or more runtime alias checks for the other minimum access and one or more runtime alias checks for the other maximum access. In some embodiments, the steps include identifying, by the compiler, in the code loop, a first memory access group based on the base pointer and a second memory access group based on another base pointer, wherein the first memory access group and the second memory access group share a common memory access pattern; generating, by the compiler, a third portion of runtime code to determine another minimum access based on the minimum access and determine another maximum access based on the maximum access; wherein generating the second portion of runtime code includes generating, by the compiler, the second portion of runtime code including one or more runtime alias checks for the other minimum access and one or more runtime alias checks for the other maximum access. In some embodiments, the steps include determining, by the compiler, an estimated cost of the one or more runtime checks; and determining, by the compiler, that the estimated cost falls below a threshold; wherein generating the first portion of runtime code and generating the second portion of runtime code are performed in response to the estimated cost falling below the threshold. In some embodiments, the steps include applying, by the compiler, one or more loop optimizations to the code loop.

In some embodiments, a computer program product for optimizing runtime alias checks is disposed upon a computer readable medium and includes computer program instructions that, when executed, cause a computer to perform steps including: identifying, by a compiler, a base pointer and a plurality of different memory accesses based on the base pointer in a code loop; generating, by the compiler, a first portion of runtime code to determine a minimum access and a maximum access of the plurality of different memory accesses; and generating, by the compiler, a second portion of runtime code including one or more runtime alias checks for the minimum access and one or more runtime alias checks for the maximum access.

In some embodiments, the one or more runtime alias checks are based on one or more other base pointers in the code loop. In some embodiments, the steps include identifying, by the compiler, in the code loop, a first memory access group based on the base pointer and a second memory access group based on another base pointer, wherein the first memory access group and the second memory access group share a common memory access pattern; wherein generating the first portion of runtime code to determine the minimum access and the maximum access of the plurality of different memory addresses includes generating, by the compiler, the first portion of runtime code to determine the minimum access and the maximum access based on the common memory access pattern. In some embodiments, generating the first portion of runtime code to determine the minimum access and the maximum access of the plurality of different memory addresses includes generating, by the compiler, the first portion of runtime code to determine another minimum access for the other base pointer and another maximum access for the other base pointer based on the common memory access pattern; and generating the second portion of runtime code includes generating, by the compiler, the second portion of runtime code including one or more runtime alias checks for the other minimum access and one or more runtime alias checks for the other maximum access. In some embodiments, the steps include identifying, by the compiler, in the code loop, a first memory access group based on the base pointer and a second memory access group based on another base pointer, wherein the first memory access group and the second memory access group share a common memory access pattern; generating, by the compiler, a third portion of runtime code to determine another minimum access based on the minimum access and determine another maximum access based on the maximum access; wherein generating the second portion of runtime code includes generating, by the compiler, the second portion of runtime code including one or more runtime alias checks for the other minimum access and one or more runtime alias checks for the other maximum access. In some embodiments, the steps include determining, by the compiler, an estimated cost of the one or more runtime checks; and determining, by the compiler, that the estimated cost falls below a threshold; wherein generating the first portion of runtime code and generating the second portion of runtime code are performed in response to the estimated cost falling below the threshold.

Optimizing runtime alias checks in accordance with the present disclosure is generally implemented with computers, that is, with automated computing machinery. For further explanation, therefore, FIG. 1 sets forth a block diagram of automated computing machinery including an exemplary computer 100 configured for optimizing runtime alias checks according to certain embodiments. The computer 100 of FIG. 1 includes at least one computer processor 102 or 'CPU' as well as random access memory 104 ('RAM') which is connected through a high speed memory bus 106 and bus adapter 108 to processor 102 and to other components of the computer 100.

Stored in RAM 104 is an operating system 110. Operating systems useful in computers configured for optimizing runtime alias checks include UNIX™, Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the compiler 114 for optimizing runtime alias checks.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for optimizing runtime alias checks include Integrated Drive Electronics ('IDE') adapters, Small computer System Interface ('SCSI') adapters, and others as will occur to those of skill in the art. In some embodiments, non-volatile computer memory is implemented for as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for optimizing runtime alias checks include modems for wired dial-up communications, Ethernet (IEEE 802.3) adapters for wired data communications, and 802.11 adapters for wireless data communications.

Figure 2:
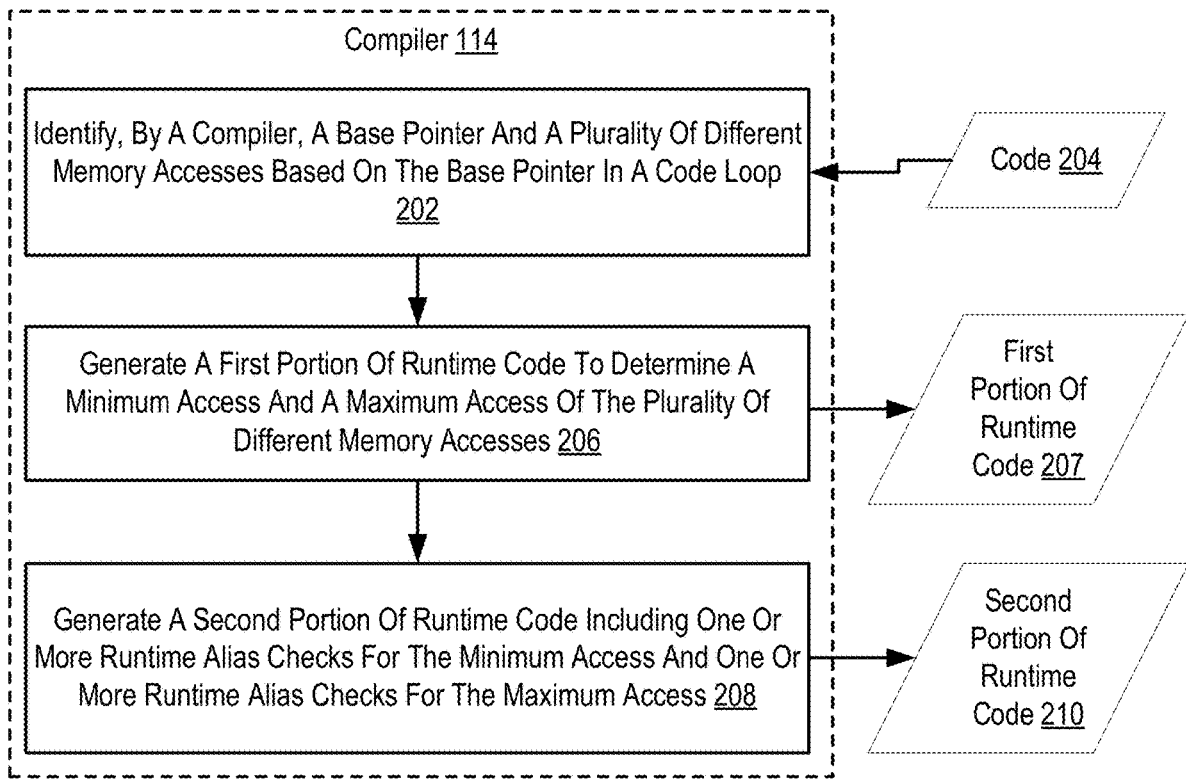
FIG. 2 is a flowchart of an example method for optimizing runtime alias checks according to some embodiments.

For further explanation, FIG. 2 sets forth a flow chart illustrating an exemplary method for optimizing runtime alias checks that includes identifying 202, by the compiler 114, a base pointer and a plurality of different memory accesses based on the pointer in a code loop (e.g., a code loop in code 204 to be compiled by the compiler 114). The code loop includes an iterating portion of code 204 (e.g., a "for" loop, a "while" loop, etc.). The base pointer is a symbolic reference to a pointer to a location in memory. For example, the base pointer corresponds to a declared variable in the code loop, or an attribute input to a function that includes the code loop.

The plurality of different memory accesses based on the base pointer are accesses to locations in memory using the base pointer or the base pointer and an offset. Where an offset is not used to access memory, and only the base pointer is used, the offset is considered to be NULL. Accordingly, where combinations of base pointers and offsets are discussed, it is assumed that such combinations include the base pointer itself (e.g., having a NULL offset). The subscript includes an loop induction variable and/or a combination of an loop induction variable and an offset. The loop induction variable includes a variable modified during iteration of the code loop. The offset includes a value to which the loop induction variable is added or subtracted to determine the particular memory location accessed during each iteration of the loop. A particular memory access is defined by its base pointer and its offset.

Example code 204 is presented below, hereinafter referred to as the "foo" example function:

```
void foo (int *A, int *B, int *X1, int *X2, int *X3,
    int *X4, int S, int E, int P, int Q, int R) {
    for (int i = S; i < E; ++i) {
        X1[i] = A[i + P] + A[i + Q] + A[i + R] +
            A[i + 2*P] + A[i + 2*Q] + A[i + 2*R] +
            A[i + 3*P] + A[i + 3*Q] + A[i + 3*R] +
            A[i + 4*P] + A[i + 4*Q] + A[i + 4*R] +
        X2[i] = i;
        X3[i] = i;
        X4[i] = i; }}
```

In the "foo" example function, "i" serves as the loop induction variable. The code loop includes base pointers "A," "X1," "X2," "X3," and "X4." In the "foo" example function, the base pointer "A" serves as the basis for twelve different memory accesses during each iteration of the loop: A[P], A[Q], A[R], A[2*P], A[2*Q], A[2*R], A[3*P], A[3*Q], A[3*R], A[4*P], A[4*Q], A[4*R]. Each memory access corresponds to a range of addresses accessed relative to the memory access during the loop. A range of a particular memory access is defined by its base pointer, its offset, and the range of memory accesses determined by the loop induction variable. For example, given a start value of "S" for "i" and an end value of "E" for "i," a range for memory access A[i+P] would start at A[S+P] and end at A[S+E].

The plurality of different memory accesses are read accesses and/or write accesses. The base pointer is identified as not being able to be determined at compile time. Thus, the specific memory addresses targeted by the plurality of different memory accesses are unable to be determined at compile time. Moreover, the base pointer is identified as one of a plurality of base pointers that are unable to be determined at compile time.

The method of FIG. 2 also includes generating 206 a first portion of runtime code 207 (e.g., machine-executable instructions) to determine a minimum access and a maximum access of the plurality of different memory accesses. Given that the plurality of different memory accesses are expressed as a base pointer, or a base pointer and an offset, the minimum access is a lowest memory access in a range of memory accesses and the maximum access is a highest memory access of the range of memory accesses.

In the "foo" example function, the base pointer "A" serves as the basis for twelve different memory accesses during each iteration of the loop: A[P], A[Q], A[R], A[2*P], A[2*Q], A[2*R], A[3*P], A[3*Q], A[3*R], A[4*P], A[4*Q], A[4*R]. Accordingly, the minimum access "MIN_A" is determined as MIN(A[P], A[Q], A[R], A[2*P], A[2*Q], A[2*R], A[3*P], A[3*Q], A[3*R], A[4*P], A[4*Q], A[4*R]) and the maximum access is determined as MAX(A[P], A[Q], A[R], A[2*P], A[2*Q], A[2*R], A[3*P], A[3*Q], A[3*R], A[4*P], A[4*Q], A[4*R]). In other words, when executed, the first portion of runtime code 207 determines "MIN_A" and "MAX_A."

The method of FIG. 2 also includes generating 208 a second portion of runtime code 210 (e.g., machine-executable instructions) including one or more runtime alias checks for the minimum access and one or more runtime alias checks for the maximum access. Runtime alias checks are functions that determine whether a memory range for a given memory access (e.g., the range of memory accessed by the given memory access) conflicts with a memory range for another memory access. A conflict exists when a range for a write memory access overlaps with the range for another memory access (e.g., a read memory access or another write memory access). The runtime alias checks are included in executable code (e.g., the compiled code 210) such that the runtime alias checks are performed when the executable code is executed.

In existing solutions, runtime alias checks are performed for each different memory access (e.g., each base pointer and offset combination) such that memory ranges for each write memory access are compared to memory access ranges every other memory access. In other words, assuming a grouping of memory accesses, ranges for each write access in the grouping of memory accesses are compared to ranges of every other memory access in the grouping. As the number of different memory access increases, the number of runtime alias checks also increases.

In contrast, the runtime code (e.g., the first portion of runtime code 207 and second portion of runtime code 210) is generated such that, for a given base pointer associated with multiple memory accesses, only the minimum access and the maximum access are included in the grouping of memory accesses for the runtime alias checks. In other words, the runtime alias checks for the base pointer exclude memory access from the plurality of different memory accesses other than the minimum access and maximum access. Where the base pointer is a first base pointer and a second base pointer is included in the code loop and associated with multiple different memory accesses, the grouping from which runtime alias checks are generated would include the minimum and maximum accesses for the first base pointer and the minimum and maximum accesses for the second base pointer, etc.

Returning to the example of the "foo" function above, were runtime alias checks generated for each memory access as in existing solutions, the set of runtime alias checks would be as follows:
1) Range Check X1 & A's (all accesses)
   X1 & A[P]
   X1 & A[Q]
   X1 & A[R]
   X1 & A[2*P]
   X1 & A[2*Q]
   X1 & A[2*R]
   X1 & A[3*P]
   X1 & A[3*Q]
   X1 & A[3*R]
   X1 & A[4*P]
   X1 & A[4*Q]
   X1 & A[4*R]
2) Range Check X2 & A
   Like X1 & A, X2 required range check against A's 12 accesses
3) Range Check X3 & A
   Like X1 & A, X3 required range check against A's 12 accesses
4) Range Check X4 & A
   Like X1 & A, X4 required range check against A's 12 accesses
5) Range Check X1 & X2
6) Range Check X1 & X3
7) Range Check X1 & X4
8) Range Check X2 & X3
9) Range Check X2 & X4
10) Range Check X3 & X4

In contrast, by excluding memory accesses based on the base pointer A other than the minimum and maximum access, the runtime alias checks are as follows:
1) Identify Min & Max:
   MIN_A=MIN(A[P], A[Q], A[R], A[2*P], A[2*Q], A[2*R], A[3*P], A[3*Q], A[3*R], A[4*P], A[4*Q], A[4*R])
   MAX_A=MAX(A[P], A[Q], A[R], A[2*P], A[2*Q], A[2*R], A[3*P], A[3*Q], A[3*R], A[4*P], A[4*Q], A[4*R])
2) Range Check X1 & A (Min & Max):
   (a) X1 & MIN_A (b) X1 & MAX_A
3) Range Check X2 & A (Min & Max):
   (a) X2 & MIN_A (b) X2 & MAX_A
4) Range Check X3 & A (Min & Max):
   (a) X3 & MIN_A (b) X3 & MAX_A
5) Range Check X4 & A (Min & Max):
   (a) X4 & MIN_A (b) X4 & MAX_A
6) Range Check X1 & X2
7) Range Check X1 & X3
8) Range Check X1 & X4
9) Range Check X2 & X3
10) Range Check X2 & X4
11) Range Check X3 & X4

This provides for computational performance improvement by reducing the number of runtime alias checks required. In some embodiments, the compiler 114 applies loop optimizations (e.g., auto vectorization, loop versioning, loop distribution, loop load elimination, loop tiling, etc.) to the code loop which necessitate the runtime alias checks. In such an embodiment, the compiler 114 determines to apply the loop optimizations if the performance benefit provided by the loop optimization outweighs the performance cost of the runtime alias checks. By reducing the number of required runtime alias checks, loop optimizations are applied that would otherwise be rejected due to a greater number of required runtime alias checks.

In some embodiments, the first portion of runtime code 207 and second portion of runtime code 210 are included in a compiled version of the code 204 such that the generated runtime alias checks are executed when the compiled code is executed.

Figure 3:
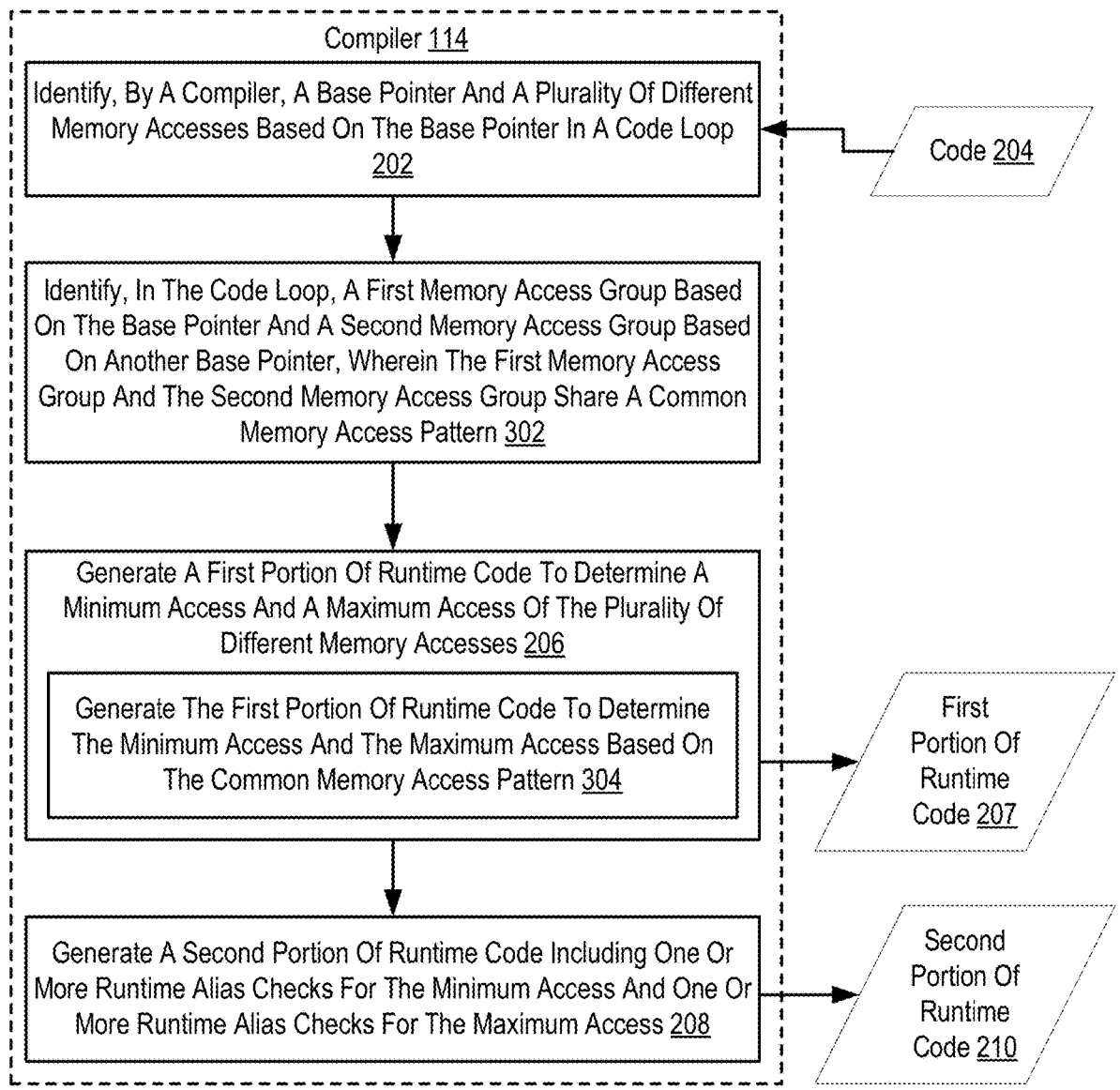
FIG. 3 is a flowchart of an example method for optimizing runtime alias checks according to some embodiments.

For further explanation, FIG. 3 sets forth a flow chart illustrating an exemplary method for optimizing runtime alias checks that includes identifying 202, by a compiler 114, a base pointer and a plurality of different memory accesses based on the pointer in a code loop; generating 206 a first portion of runtime code 207 to determine a minimum access and a maximum access of the plurality of different memory accesses; and generating 208 a second portion of runtime code 210 including one or more runtime alias checks for the minimum address and one or more runtime alias checks for the maximum address.

The method of FIG. 3 differs from FIG. 2 in that the method of FIG. 3 also includes identifying 302, in the code loop, a first memory access group based on the first pointer and a second memory access group based on another base pointer, wherein the first memory access group and the second memory access group share a common memory access pattern. A memory access group for a given base pointer includes all memory accesses relative to that base pointer. A memory access pattern for a memory access group includes the set of subscripts (e.g., the offsets) for each of the memory accesses. Consider the following function, hereinafter referred to as the "foo2" example function:

```
void foo2 (int *A, int *B, int S
    int E, int P, int Q, int R) {
    for (int i = S; i < E; ++i) {
        X1[i] = A[i + P] + A[i + Q] + A[i + R] +
            A[i + 2*P] + A[i + 2*Q] + A[i + 2*R] +
            A[i + 3*P] + A[i + 3*Q] + A[i + 3*R] +
            A[i + 4*P] + A[i + 4*Q] + A[i + 4*R] +
            B[i + P] + B[i + Q] + B[i + R] +
            B[i + 2*P] + B[i + 2*Q] + B[i + 2*R] +
            B[i + 3*P] + B[i + 3*Q] + B[i + 3*R] +
            B[i + 4*P] + B[i + 4*Q] + B[i + 4*R] +
        X2[i] = i;
        X3[i] = i;
        X4[i] = i;
    } }
```

In the "foo2" example function, the memory access group for the base pointer A is (A[P], A[Q], A[R], A[2*P], A[2*Q], A[2*R], A[3*P], A[3*Q], A[3*R], A[4*P], A[4*Q], A[4*R]). The memory access pattern for the base pointer A is ([P], [Q], [R], [2*P], [2*Q], [2*R], [3*P], [3*Q], [3*R], [4*P], [4*Q], [4*R]). The "foo2" example function also includes a base pointer B sharing a same memory access pattern as A.

The method of FIG. 3 further differs from FIG. 2 in that generating 206 the first portion of runtime code 207 to determine the minimum access and the maximum access of the plurality of different memory addresses includes generating 304 the first portion of runtime code to determine the minimum access and the maximum access based on the common memory access pattern. For example, the first portion of runtime code 207 is generated to include instructions to identify, at runtime, a minimum and maximum value from the common memory access pattern. Continuing with the "foo2" example, such instructions are expressed as "MIN_Common=MIN(P, Q, R, 2*P, 2*Q, 2*R, 3*P, 3*Q, 3*R, 4*P, 4*Q, 4*R), MAX_Common=MAX(P, Q, R, 2*P, 2\*Q, 2\*R, 3\*P, 3\*Q, 3\*R, 4\*P, 4\*Q, 4\*R)" where MIN_Common is a minimum value in the common memory access pattern and MAX_Common is a maximum value in the common memory access pattern.

The minimum access value is then determined by incrementing the base pointer by the minimum value in the common memory access pattern, and the maximum access is determined by incrementing the base pointer by the maximum value in the common memory access pattern. Accordingly, the first portion of runtime code 207 is generated to include instructions to determine the minimum access at runtime by incrementing the base pointer by the minimum value in the common memory access pattern, and instructions to determine the maximum access by incrementing the base pointer by the maximum value in the common memory access pattern.

Figure 4:
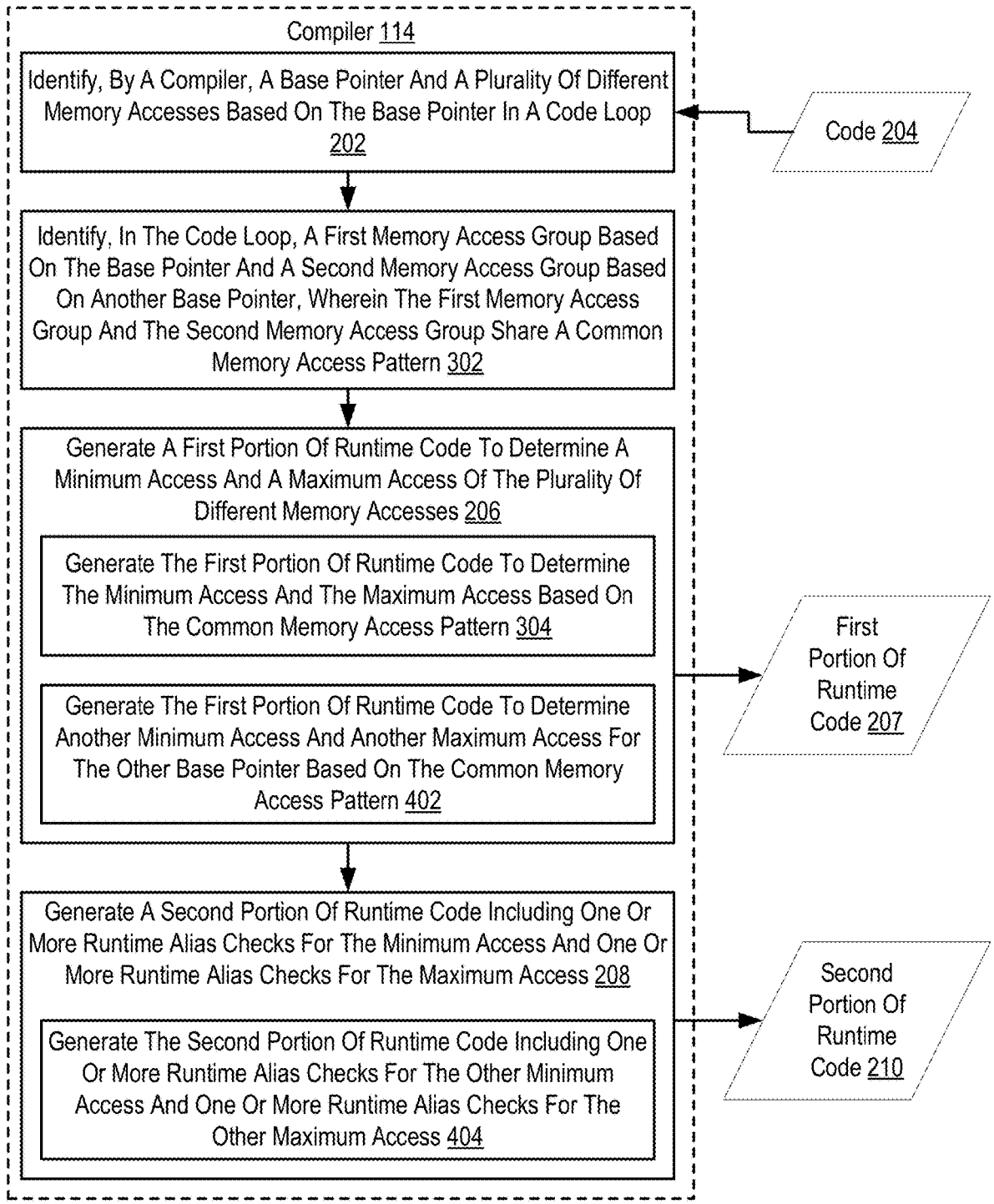
FIG. 4 is a flowchart of an example method for optimizing runtime alias checks according to some embodiments.

For further explanation, FIG. 4 sets forth a flow chart illustrating an exemplary method for optimizing runtime alias checks that includes identifying 202, by a compiler 114, a base pointer and a plurality of different memory accesses based on the pointer in a code loop; identifying 302, in the code loop, a first memory access group based on the first pointer and a second memory access group based on another base pointer, wherein the first memory access group and the second memory access group share a common memory access pattern; generating 206 a first portion of runtime code 207 to determine a minimum access and a maximum access of the plurality of different memory accesses by generating 304 the first portion of runtime code to determine the minimum access and the second minimum access based on the common memory access pattern; and generating 208 a second portion of runtime code 210 including one or more runtime alias checks for the minimum address and one or more runtime alias checks for the maximum address.

The method of FIG. 4 differs from FIG. 3 in that generating 206 a first portion of runtime code 207 to determine a minimum access and a maximum access of the plurality of different memory accesses also includes generating 402 the first portion of runtime code 207 to determine the another minimum access and another maximum access for the other base pointer based on the common memory access pattern. For example, the first portion of runtime code 207 is generated to include instructions to find the minimum value of the common memory access pattern and the maximum value of the common memory access pattern. The first portion of runtime code 207 is then generated to determine minimum and maximum accesses for any base pointer sharing the common memory access pattern using the determined minimum value of the common memory access pattern and the maximum value of the common memory access pattern. Continuing with the "foo2" example function, the minimum access for the B base pointer is determined (e.g., by executing the first portion of runtime code 207) by incrementing the B base pointer by the minimum value of the common memory access pattern and the maximum access is determined by incrementing the B base pointer by the maximum value of the common memory access pattern.

The method of FIG. 4 differs from FIG. 3 in that generating 208 a second portion of runtime code 210 including one or more runtime alias checks for the minimum access and one or more runtime alias checks for the maximum access includes generating 404 the second portion of runtime code 210 including one or more runtime alias checks for the other minimum access and one or more runtime alias checks for the other maximum access. Thus, the second portion of runtime code 210 includes runtime alias checks for the minimum and maximum accesses for the first base pointer and minimum and maximum accesses for the second base pointer.

Figure 5:
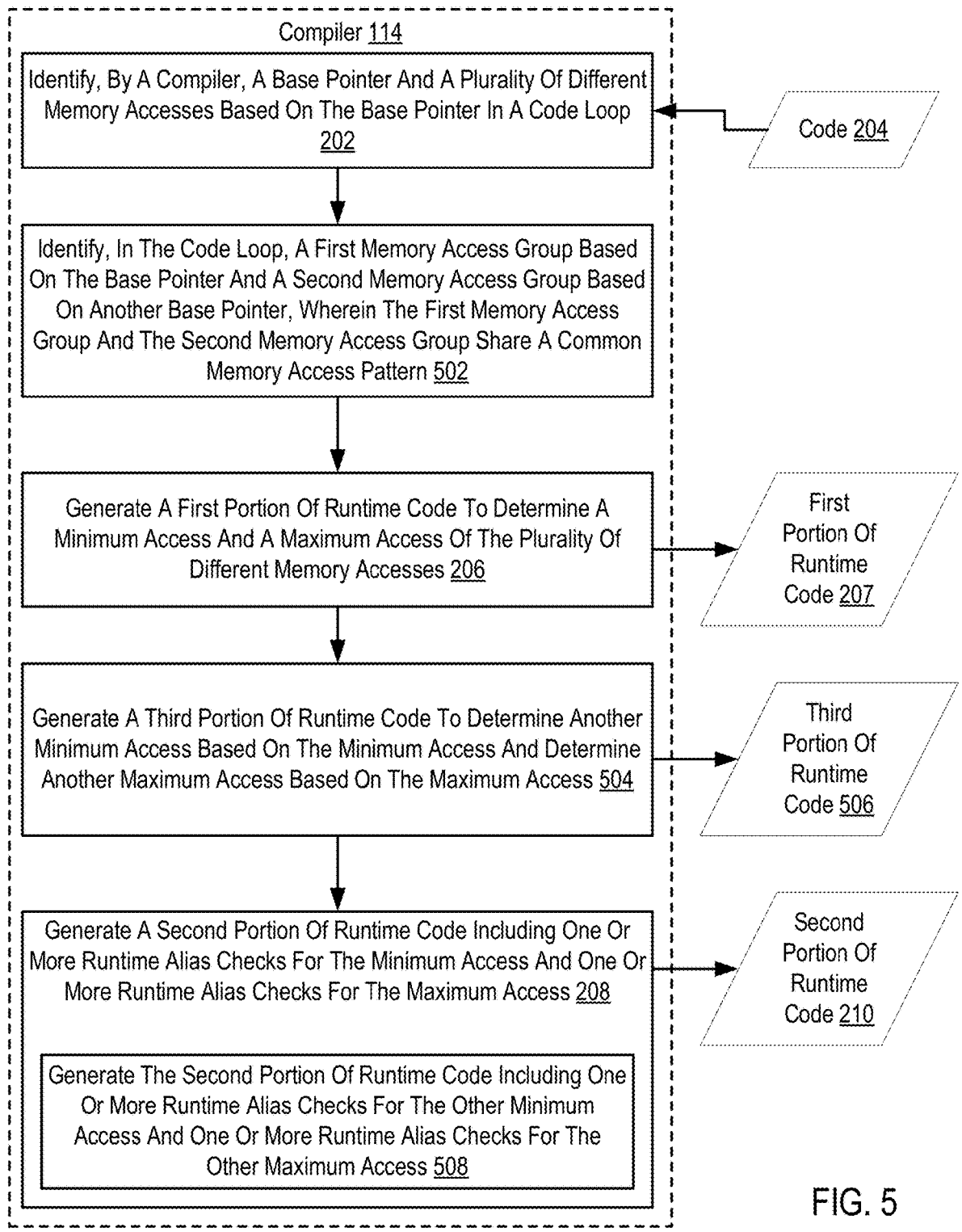
FIG. 5 is a flowchart of an example method for optimizing runtime alias checks according to some embodiments.

For further explanation, FIG. 5 sets forth a flow chart illustrating an exemplary method for optimizing runtime alias checks that includes identifying 202, by a compiler 114, a base pointer and a plurality of different memory accesses based on the pointer in a code loop; generating 206 a first portion of runtime code 207 to determine a minimum access and a maximum access of the plurality of different memory accesses; and generating 208 a second portion of runtime code 210 including one or more runtime alias checks for the minimum address and one or more runtime alias checks for the maximum address.

The method of FIG. 5 differs from FIG. 2 in that the method of FIG. 5 also includes identifying 502, in the code loop, a first memory access group based on the first pointer and a second memory access group based on another base pointer, wherein the first memory access group and the second memory access group share a common memory access pattern. The method of FIG. 5 further differs from FIG. 2 in that the method of FIG. 5 also includes generating 504 a third portion of runtime code to determine another minimum access (e.g., for the other base pointer) based on the minimum access (e.g., for the base pointer) and determine another maximum access (e.g., for the other base pointer) based on the maximum access (e.g., for the base pointer).

When the third portion of the runtime code 506 is executed, the minimum access and maximum access for the base pointer have been determined. As the other base pointer shares a minimum access pattern with the base pointer, the other minimum access for the other base pointer is determined (e.g., by executing the third portion of the runtime code 506) by incrementing the other base pointer by the minimum access decremented by the base pointer. The other maximum access for the other base pointer is determined (e.g., by executing the third portion of the runtime code 506) by incrementing the other base pointer by the maximum access decremented by the base pointer. Continuing with the "foo2" example function where base pointers A and B share a common memory access pattern, the minimum access for B "MIN_B" is determined as "MIN_B=B+MIN_A−A." The maximum access for B "MAX_B" is determined as "MAX_B=B+MAX_A−A."

The method of FIG. 5 differs from FIG. 2 in that generating 208 a second portion of runtime code 210 including one or more runtime alias checks for the minimum access and one or more runtime alias checks for the maximum access includes generating 508 the second portion of runtime code 210 including one or more runtime alias checks for the other minimum access and one or more runtime alias checks for the other maximum access. Thus, the second portion of runtime code 210 includes runtime alias checks for the minimum and maximum accesses for the first base pointer and minimum and maximum accesses for the second base pointer.

Figure 6:
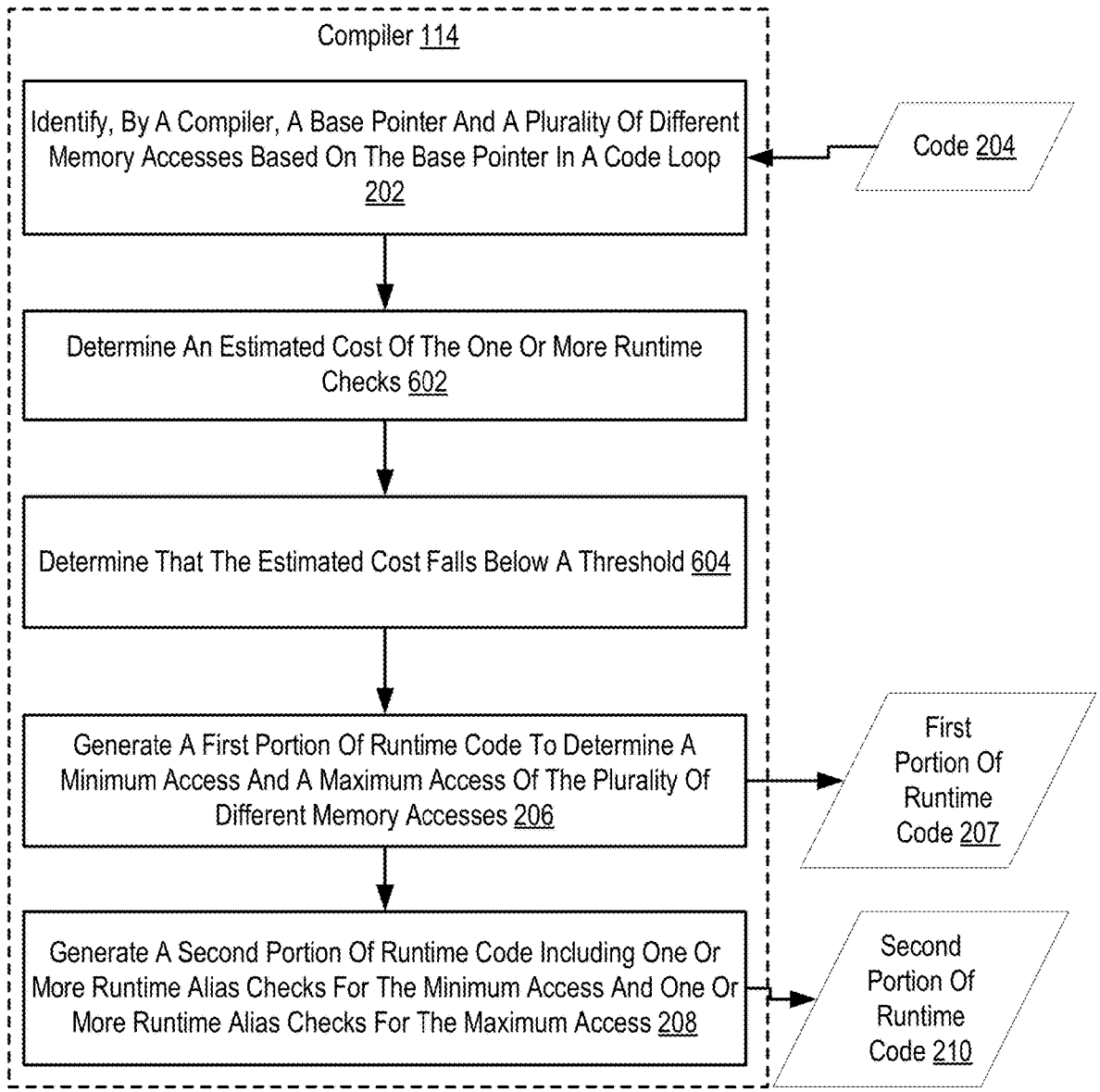
FIG. 6 is a flowchart of an example method for optimizing runtime alias checks according to some embodiments.

For further explanation, FIG. 6 sets forth a flow chart illustrating an exemplary method for optimizing runtime alias checks that includes identifying 202, by a compiler 114, a base pointer and a plurality of different memory accesses based on the pointer in a code loop; generating 206 a first portion of runtime code 207 to determine a minimum access and a maximum access of the plurality of different memory accesses; and generating 208 a second portion of runtime code 210 including one or more runtime alias checks for the minimum address and one or more runtime alias checks for the maximum address.

The method of FIG. 6 differs from FIG. 2 in that the method of FIG. 6 also includes determining 602 an estimated cost of the one or more runtime checks. For example, the estimated cost is expressed as a number of runtime checks or a number of instructions required to perform the runtime checks. The number of runtime checks or instructions required to perform the runtime checks is determined based on a number of memory accesses in the plurality of different memory accesses.

The method of FIG. 6 further differs from FIG. 2 in that the method of FIG. 6 also includes determining 604 that the estimated cost falls below a threshold. As an example, the threshold corresponds to an expected performance for applying one or more loop operations. Thus, the first portion of runtime code 207 and second portion of runtime code 210 are only generated when the cost falls below the threshold. Where the first portion of runtime code 207 and second portion of runtime code 210 are to be generated in response to applying one or more loop optimizations, the loop optimizations are only performed when the estimated cost falls below the threshold.

In view of the explanations set forth above, readers will recognize that the benefits of optimizing runtime alias checks according to embodiments of the present disclosure include:
  Improved performance of a computing system by reducing a number of required runtime alias checks in compiled code.
  Improved performance of a computing system by promoting the use of loop optimizations due to the reduced number of runtime alias checks.

Exemplary embodiments of the present disclosure are described largely in the context of a fully functional computer system for optimizing runtime alias checks. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of optimizing runtime alias checks, the method comprising:
   identifying, by a compiler, a base pointer and a plurality of different memory accesses based on the base pointer and a second base pointer in a code loop;
   generating, by the compiler, a first portion of runtime code to determine a minimum access and a maximum access of the plurality of different memory accesses for the base pointer; and
   generating, by the compiler, a second portion of runtime code including one or more runtime alias checks for the second base pointer using the minimum access and the maximum access determined for the base pointer.

2. The method of claim 1, wherein the one or more runtime alias checks are based on one or more other base pointers in the code loop.

3. The method of claim 1, further comprising:
   identifying, by the compiler in the code loop, a first memory access group based on the base pointer and a second memory access group based on another base pointer, wherein the first memory access group and the second memory access group share a common memory access pattern;
   wherein generating the first portion of runtime code to determine the minimum access and the maximum access of the plurality of different memory accesses comprises generating, by the compiler, the first portion of runtime code to determine the minimum access and the maximum access based on the common memory access pattern.

4. The method of claim 3, wherein:
   generating the first portion of runtime code to determine the minimum access and the maximum access of the plurality of different memory accesses comprises generating, by the compiler, the first portion of runtime code to determine another minimum access for the other base pointer and another maximum access for the other base pointer based on the common memory access pattern; and
   generating the second portion of runtime code comprises generating, by the compiler, the second portion of runtime code including one or more runtime alias checks for the other minimum access and one or more runtime alias checks for the other maximum access.

5. The method of claim 1, further comprising:
   identifying, by the compiler in the code loop, a first memory access group based on the base pointer and a second memory access group based on another base pointer, wherein the first memory access group and the second memory access group share a common memory access pattern;
   generating, by the compiler, a third portion of runtime code to determine another minimum access based on the minimum access and determine another maximum access based on the maximum access;
   wherein generating the second portion of runtime code comprises generating, by the compiler, the second portion of runtime code including one or more runtime alias checks for the other minimum access and one or more runtime alias checks for the other maximum access.

6. The method of claim 1, further comprising:
   determining an estimated cost of the one or more runtime alias checks;
   determining that the estimated cost falls below a threshold; and
   wherein generating the first portion of runtime code and generating the second portion of runtime code are performed in response to the estimated cost falling below the threshold.

7. The method of claim 6, further comprising applying one or more loop optimizations to the code loop by the compiler.

8. An apparatus for optimizing runtime alias checks, the apparatus comprising a computer processor and computer memory operatively coupled to the computer processor, the computer memory having disposed within it computer program instructions configured to:
- identifying, by a compiler, a base pointer and a plurality of different memory accesses based on the base pointer and a second base pointer in a code loop;
- generating, by the compiler, a first portion of runtime code to determine a minimum access and a maximum access of the plurality of different memory accesses for the base pointer; and
- generating, by the compiler, a second portion of runtime code including one or more runtime alias checks for the second base pointer using the minimum access and the maximum access determined for the base pointer.

9. The apparatus of claim 8, wherein the one or more runtime alias checks are based on one or more other base pointers in the code loop.

10. The apparatus of claim 8, further configured to:
- identify, by the compiler, in the code loop, a first memory access group based on the base pointer and a second memory access group based on another base pointer, wherein the first memory access group and the second memory access group share a common memory access pattern;
- wherein generating the first portion of runtime code to determine the minimum access and the maximum access of the plurality of different memory accesses comprises generating, by the compiler, the first portion of runtime code to determine the minimum access and the maximum access based on the common memory access pattern.

11. The apparatus of claim 10, wherein:
- generating, by the compiler, the first portion of runtime code to determine the minimum access and the maximum access of the plurality of different memory accesses comprises generating the first portion of runtime code to determine another minimum access for the other base pointer and another maximum access for the other base pointer based on the common memory access pattern; and
- generating, by the compiler, the second portion of runtime code comprises generating the second portion of runtime code including one or more runtime alias checks for the other minimum access and one or more runtime alias checks for the other maximum access.

12. The apparatus of claim 8, further configured to:
- identify, by the compiler, in the code loop, a first memory access group based on the base pointer and a second memory access group based on another base pointer, wherein the first memory access group and the second memory access group share a common memory access pattern;
- generate, by the compiler, a third portion of runtime code to determine another minimum access based on the minimum access and determine another maximum access based on the maximum access; and
- wherein generating the second portion of runtime code comprises generating, by the compiler, the second portion of runtime code including one or more runtime alias checks for the other minimum access and one or more runtime alias checks for the other maximum access.

13. The apparatus of claim 8, wherein generating the first portion of runtime code and generating the second portion of runtime code are performed in response to an estimated cost of the one or more runtime alias checks falling below a threshold.

14. The apparatus of claim 13, further configured to apply, by the compiler, one or more loop optimizations to the code loop.

15. A computer program product for optimizing runtime alias checks, the computer program product disposed upon a non-transitory computer readable medium, the computer program product comprising computer program instructions that, when executed, cause a computer to perform steps comprising:
- identifying, by a compiler, a base pointer and a plurality of different memory accesses based on the base pointer and a second base pointer in a code loop;
- generating, by the compiler, a first portion of runtime code to determine a minimum access and a maximum access of the plurality of different memory accesses for the base pointer; and
- generating, by the compiler, a second portion of runtime code including one or more runtime alias checks for the second base pointer using the minimum access and the maximum access determined for the base pointer.

16. The computer program product of claim 15, wherein the one or more runtime alias checks are based on one or more other base pointers in the code loop.

17. The computer program product of claim 15, wherein the steps further comprise:
- identifying, by the compiler, in the code loop, a first memory access group based on the base pointer and a second memory access group based on another base pointer, wherein the first memory access group and the second memory access group share a common memory access pattern;
- wherein generating the first portion of runtime code to determine the minimum access and the maximum access of the plurality of different memory accesses comprises generating, by the compiler, the first portion of runtime code to determine the minimum access and the maximum access based on the common memory access pattern.

18. The computer program product of claim 17, wherein:
- generating, by the compiler, the first portion of runtime code to determine the minimum access and the maximum access of the plurality of different memory accesses comprises generating the first portion of runtime code to determine another minimum access for the other base pointer and another maximum access for the other base pointer based on the common memory access pattern; and
- generating, by the compiler, the second portion of runtime code comprises generating the second portion of runtime code including one or more runtime alias checks for the other minimum access and one or more runtime alias checks for the other maximum access.

19. The computer program product of claim 15, wherein the steps further comprise:
- identifying, by the compiler, in the code loop, a first memory access group based on the base pointer and a second memory access group based on another base pointer, wherein the first memory access group and the second memory access group share a common memory access pattern;
- generating, by the compiler, a third portion of runtime code to determine another minimum access based on the minimum access and determine another maximum access based on the maximum access; and
- wherein generating, by the compiler, the second portion of runtime code comprises generating the second portion of runtime code including one or more runtime alias checks for the other minimum access and one or more runtime alias checks for the other maximum access.

20. The computer program product of claim 15, wherein the first portion of runtime code and the second portion of runtime code are generated in dependence on an estimated cost of the one or more runtime alias checks.

* * * * *